(12) United States Patent
Van Bealen

(10) Patent No.: US 7,908,703 B2
(45) Date of Patent: Mar. 22, 2011

(54) WIPER BLADE

(75) Inventor: David Van Bealen, Herent (BE)

(73) Assignee: Robert Bosch GmbH, Stuttgart (DE)

( * ) Notice: Subject to any disclaimer, the term of this patent is extended or adjusted under 35 U.S.C. 154(b) by 832 days.

(21) Appl. No.: 11/587,017

(22) PCT Filed: Feb. 23, 2005

(86) PCT No.: PCT/EP2005/050761
§ 371 (c)(1),
(2), (4) Date: Jul. 11, 2007

(87) PCT Pub. No.: WO2005/102802
PCT Pub. Date: Nov. 3, 2005

(65) Prior Publication Data
US 2007/0289079 A1    Dec. 20, 2007

(30) Foreign Application Priority Data
Apr. 22, 2004  (DE) .......................... 10 2004 019 541

(51) Int. Cl.
*B60S 1/40* (2006.01)
(52) U.S. Cl. ...................................... 15/250.32; 15/201
(58) Field of Classification Search ............. 15/250.32, 15/250.34, 250.43, 250.201; *B60S 1/38, B60S 1/40*
See application file for complete search history.

(56) References Cited

U.S. PATENT DOCUMENTS

| 5,070,573 | A | * | 12/1991 | Journee et al. | ............. | 15/250.32 |
| 2004/0216260 | A1 | * | 11/2004 | Genet et al. | ................. | 15/250.32 |
| 2004/0244137 | A1 | * | 12/2004 | Poton | ......................... | 15/250.32 |

FOREIGN PATENT DOCUMENTS

| FR | 2 600 291 | | 12/1987 |
| FR | 2 738 201 | | 3/1997 |
| FR | 2738201 | * | 3/1997 |
| WO | WO 03/033316 | | 4/2003 |

* cited by examiner

*Primary Examiner* — Monica S Carter
*Assistant Examiner* — Stephanie Newton
(74) *Attorney, Agent, or Firm* — Michael Best & Friedrich LLP

(57) ABSTRACT

A wiper blade (18) with a connecting device (84) to connect a wiper arm (10), which connecting device features a pivoted adapter (66) equipped with holding surfaces (70, 72) for the wiper arm (10) and an openable and closeable protective cap (26), which in its closed position can fix the wiper arm (10) with limiting surfaces (64) arranged on an inner side by means of the holding surfaces (70, 72). The protective cap (26) has an openable and closeable cover (50) with an opening in its covering wall through which the wiper arm (10) can be connected to the adapter (66).

16 Claims, 3 Drawing Sheets

WIPER BLADE

BACKGROUND OF THE INVENTION

The invention starts with a wiper blade.

A windshield with a non-articulated wiper blade, which has an articulated connection for a wiper rod of a wiper arm with a hook-shaped end, is known from WO 03/033316 A1. The articulated connection is comprised of a connecting device, which is fastened to a supporting element of the wiper blade by means of claws. The connecting device has an articulated axis, which is held in its two sidewalls, and on which the adapter is pivoted by means of a hub that is open towards the wiper blade.

The hook-shaped end of the wiper rod is pushed from the front side over the adapter and then is adjacent with the inner side of the bent part to a convex bearing surface on the circumference of the open hub and with the inner surface of its upper leg to a supporting surface of the adapter. A lateral guide between the hook-shaped end and the adapter is achieved via side cheeks of the adapter, which project over the bearing surface and the supporting surface. The hook-shaped end locks with the adapter by means of locking noses, which are arranged in the front area on extensions of the side cheeks of the adapter and deflect elastically to the outside during assembly. In an assembled state the locking noses reassume their initial position and prevent the hook-shaped end from detaching from the adapter during operation.

In order to prevent the locking noses from being subjected to excess pressure from short-term peak stress to the wiper blade, a cap is provided that forms the front area of the connecting device and is connected with it in a detachable manner. The cap uses inner bearing surfaces to prevent the locking noses from deflecting to the outside and thereby being able to be subject to excess pressure. The sidewalls of the connecting device laterally cover the adapter and the hook-shaped end of the wiper rod and are correspondingly notched in the area of the cap. One sidewall has a bearing element on the fore part that faces the cap and the bearing axis of this bearing element runs essentially perpendicular to a vehicle window, and it cooperates with a bearing element on the cap. One of the bearing elements has the form of an open hub and can be clipped together with the other, cylindrical bearing element. As a result, the cap can be swiveled around the bearing axis. In order to the fix the cap on the connecting device, it has locking elements on the side opposite from the bearing elements, and these locking elements cooperate with locking elements on the connecting device and secure the closed position of the cap.

SUMMARY OF THE INVENTION

According to the invention, the protective cap features an openable and closeable cover with an opening in its covering wall through which the wiper arm can be connected to the adapter. Assembly is thereby facilitated and a secure connection of the wiper arm to the wiper blade is guaranteed.

The protective cap expediently includes the connecting device and is clipped via it, whereby the cover features the limiting surface in its inner side. In the cover's opened position, a hook-shaped end of the wiper arm is assembled on the adapter through the opening. In the cover's closed position, the hook-shaped end is then fixed on the adapter in its assembled position. The limiting surface, which is expediently formed by a limiting bridge that projects on the inner side of the cover in the area of a front wall, can act directly on the outer contour of the hook-shaped end, and namely, independently of elastically deflecting locking noses, which can be provided additionally, but can also be omitted. Since the protective cap includes the connecting device and is expediently supported on its side walls and/or its rear wall via guide or supporting ribs, the locking forces act on the connecting device via the limiting surface, the cover and the connecting cap without stressing the bearing of the adapter on the articulated bolt so that the articulation function is not impaired by forces acting in the longitudinal direction of the wiper blade.

The cover can basically be connected in any way to the protective cap. It is expediently pivoted on the protective cap in the area of a rear wall of the protective cap, which points towards the drive-side end of the wiper blade. In order to fix the cover in the closed position, it has at least one locking pin in the area of its front wall and this locking pin engages in a locking opening on the protective cap in the closed position. Forces in the longitudinal direction of the wiper blade cannot open the locking connection.

For the bearing of the cover in the area of the rear wall of the protective cap, the cover or the protective cap has at least one open hub, which cooperates with a cylindrical bearing element that is flattened on the circumference in such a way that the open hub can be pushed over the flattenings of the bearing element in the completely opened position of the cover, while the hub is held on the bearing element in a half-opened or closed position of the cover. In an operationally ready state, the outer surface of the articulated connection is largely determined by the protective cap with the cover, whereby the parts harmonically adjoin one another in a flush manner with slight joints or gaps. As a result, an optically pleasing design is produced, which due to its compact form also offers flow-related advantages during travel.

BRIEF DESCRIPTION OF THE DRAWINGS

Additional advantages are yielded from the following description of the drawing. An exemplary embodiment of the invention is depicted in the drawing. The drawing, the description and the claims contain numerous features in combination. The person skilled in the art will also observe individual features expediently and combine them into additional, meaningful combinations.

The drawing shows.

DETAILED DESCRIPTION

Figure 2:
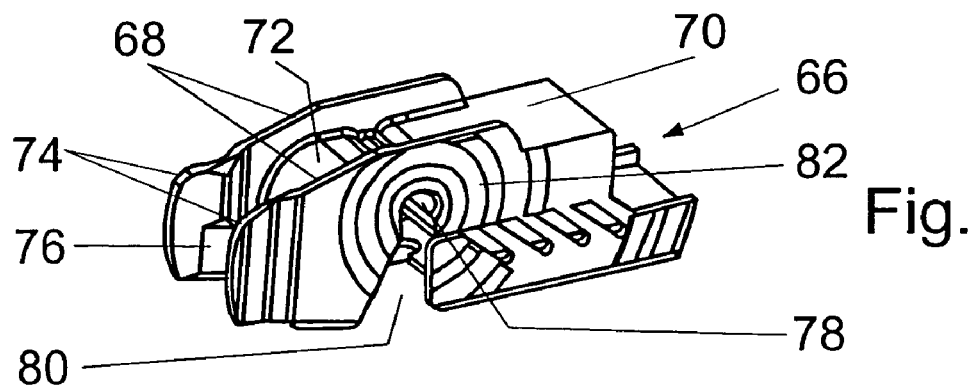
FIG. 2 A perspective view of an adapter.
Figure 3:
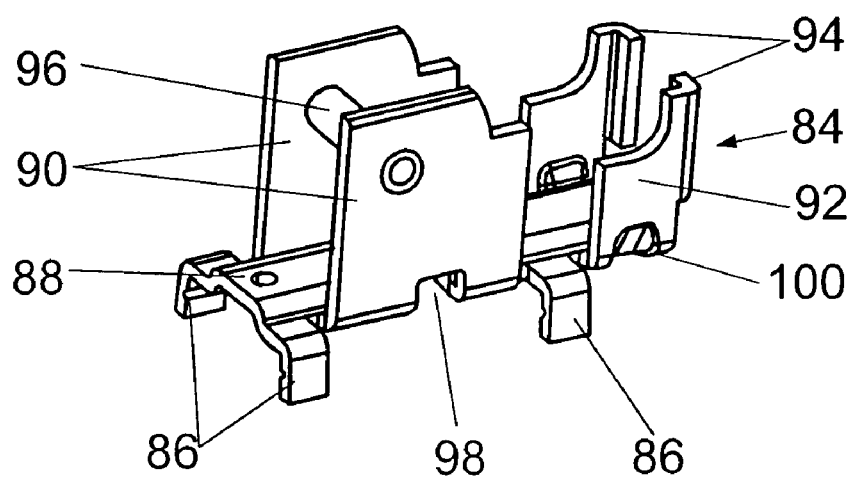
FIG. 3 A perspective view of a connecting device.

An articulated connection between a wiper blade 18 and a wiper rod 10 with a hook-shaped end 12 (FIG. 8) includes a protective cap 26 with a cover 50 (FIG. 1), an adapter 66 (FIG. 2) and a connecting device 84 (FIG. 3). The wiper rod 10 is a component of a wiper arm and can be designed in one piece with an articulated part (not shown) of the wiper arm.

The protective cap 26 has two sidewalls 28 that are structured essentially symmetrically to a longitudinal center plane, which sidewalls are connected to one another via a rear wall 30 on the rear side and a strut 36 on the front side. The intermediate space 34 formed by the sidewalls 28 can be partially closed towards the top by a cover 50. The cover 50 has an open hub 52 on each side in the area of the rear wall 30 in the extension of side walls 56 and in an open position (FIG. 1) the hub can be pushed with its opening 54 over a cylindrical bearing pin 46, which has flattenings 48 embodied on its circumference corresponding to the opening 54. By swiveling the cover 50 into a half closed or completely closed position (FIG. 4), the hub 52 and the bearing pins 46 reciprocally lock. In the cover's 50 closed position, the locking pins 62 engage on opposing inner sides of the cover 50 in corresponding locking openings 40 on the side walls 28 of the protective cap 26 in the area of the strut 36. Guide pins 38 have been provided laterally on the strut 36 to guide the cover 50 in the area of the strut 36.

The adapter 66 has two parallel side cheeks 68, which are connected via a hub 78 that is open towards the wiper blade 18. The wedge-shaped opening that widens toward the outside is designated with 80. On the outer circumference of the open hub 78, the adapter 66 has a convex bearing surface 72 for the hook-shaped end 12 of the wiper rod 10 and a supporting surface 70 for the inner side of an upper leg 14 of the hook-shaped end 12. The hook-shaped end 12 is guided laterally by parts of the side cheeks 68, which project over the supporting surface 70 and the bearing surface 72. On the front side, the adapter 66 has side wings 74 in the extension of the side cheeks 68, on which inner locking noses 76 are provided. When assembling the hook-shaped end 12, the side wings 74 deflect elastically to the outside so that the hook-shaped end 12 can pass the locking noses 76. At the end of the assembly, the side wings 74 reassume their initial position, whereby the locking noses 76 secure the assembly position of the hook-shaped end 12. The adapter 66 has stopping faces 82 or corresponding ribs on the outer side surfaces of the side cheeks 68.

The connecting device 84 has a longish base 88 in the longitudinal direction of the wiper blade 18, on which two claws 86 are formed at a distance from one another on each longitudinal side. Provided between the claws 86 are two parallel sidewalls 90, which point away from the wiper blade 18 and between which an articulated axis 96 is arranged. On the drive-side end of the wiper blade 18, the connecting device 84 has rear side walls 92, each of which features an edge 94 formed towards the inside on its rear face, which represents the drive-side delimitation. The connecting device 84 can be manufactured of sheet metal by means of non-cutting shaping via punching, bending, stamping, deep-drawing or the like or be manufactured from plastic using an injection modeling process.

Figure 1:
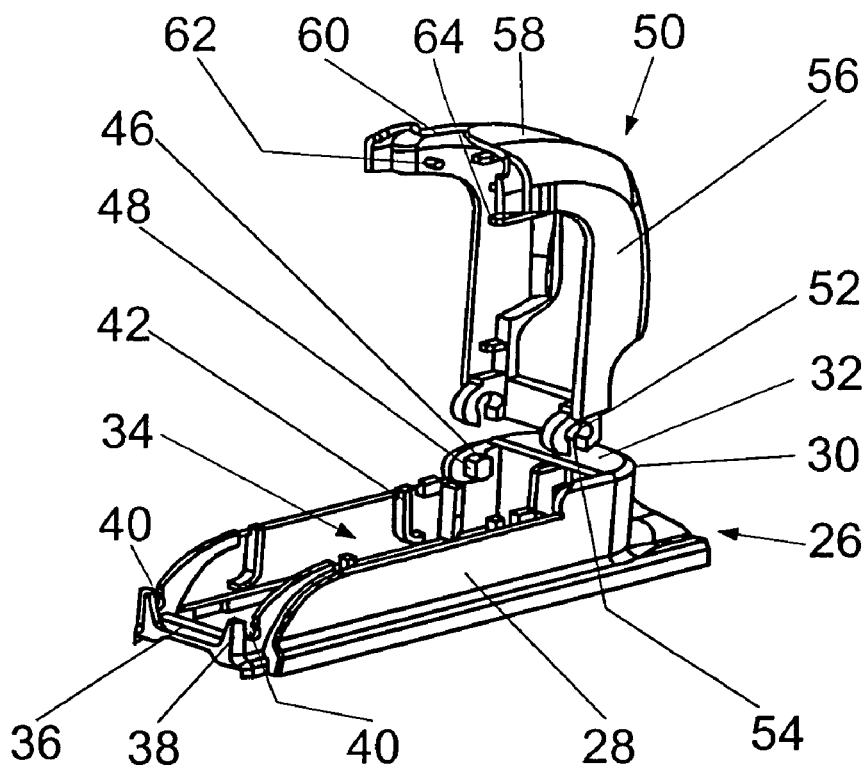
FIG. 1A perspective view of a protective cap with a cover before assembly.
Figure 4:
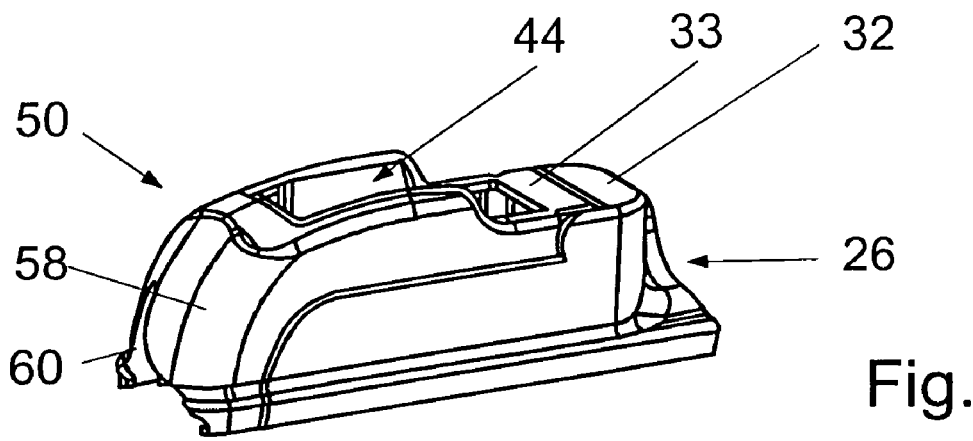
FIG. 4 A perspective view of a protective cap with an assembled, closed cover.
Figure 5:
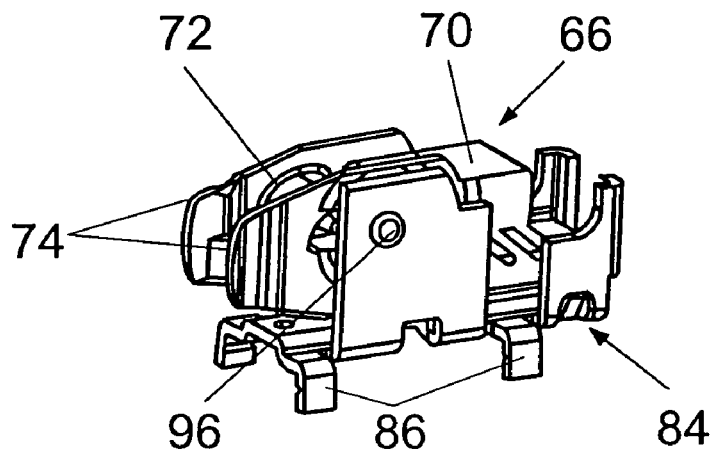
FIG. 5 A perspective view of a connecting device with a pre-assembled adapter.
Figure 6:
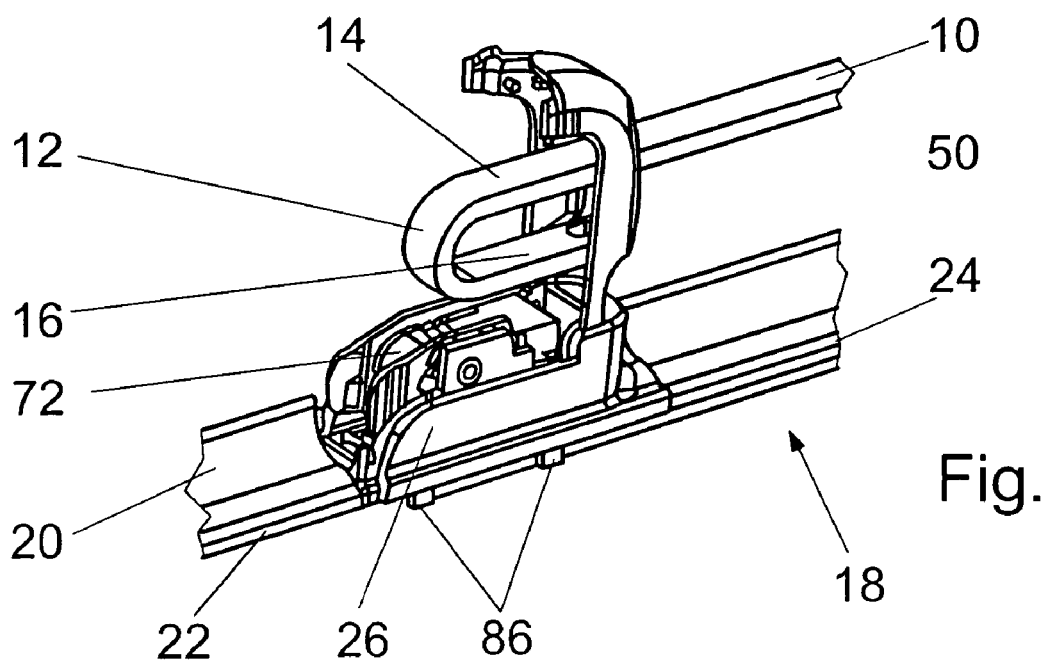
FIG. 6 A perspective view of a wiper blade with an articulated connection during assembly on a wiper rod.

FIG. 1 through FIG. 3 essentially show the assembly sequence. To begin with, the cover 50 and the protective cap 26 are joined by the open hub 52 being pushed over the bearing pins 46. Then the cover 50 is closed, whereby the locking pins 62 engage in the locking openings 40. The preassembled group is depicted in FIG. 4. The closed position shows that the sidewalls 56 of the cover are adjacent to the sidewalls 28 of the protective cap 26 with a slight joint. The covering wall 32 of the protective cap 26 in the area of the rear wall 30 lies in the same plane as the covering wall 32 of the cover 50, wherein the plane runs closer to the wiper strip 22 than the upper contour of the front part of the cover 50. The cover 50 has a front wall 58, which covers the intermediate space 34 towards the front. A connecting profile 60 for a spoiler 20 can be provided in the front wall 58.

In a second assembly step, the connecting device 84 and the adapter 66 are joined and fastened to a supporting element 24 of the wiper blade 18 by means of the claws 86. Then the protective cap 26 with the cover 50 is pushed on the connecting device 84, whereby the protective cap 26 is supported on the side walls 90, 92, 94 via guide ribs 42. The protective cap 26 locks with internal locking noses (not visible) on recesses and/or indentations 98, 100 in the sidewalls 90, 92.

Figure 7:
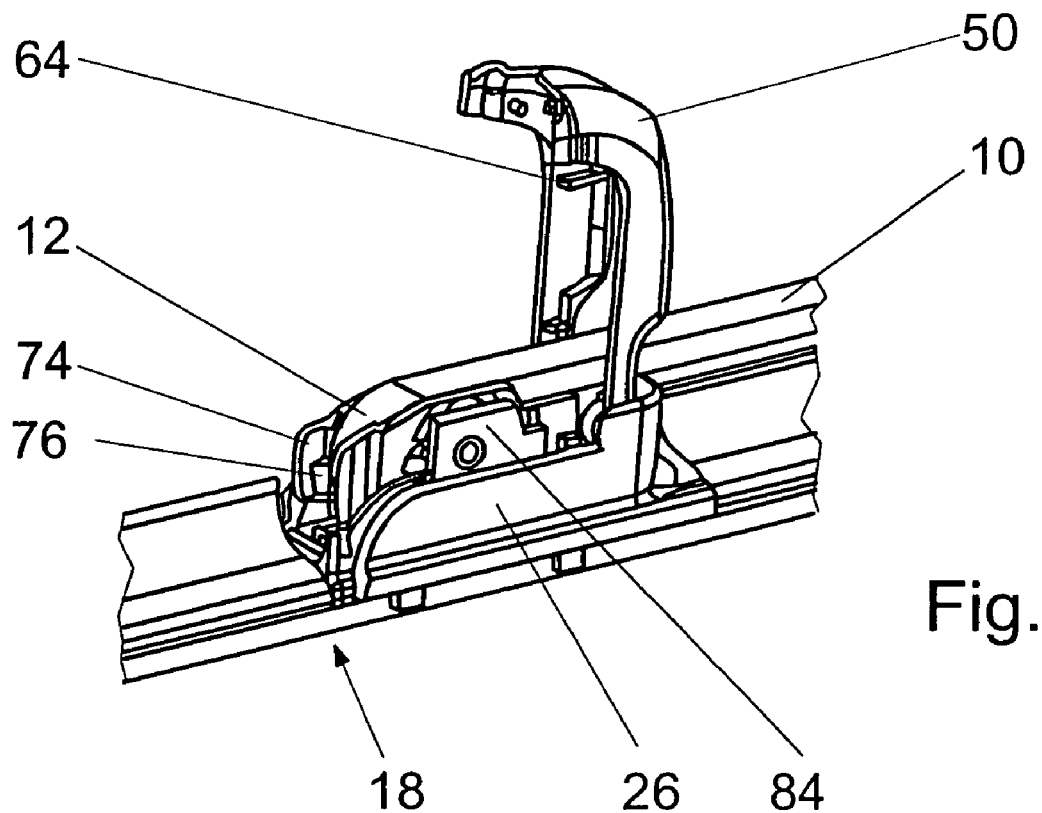
FIG. 7 A perspective view of a wiper blade that is assembled on a wiper rod, whereby the cover is open.
Figure 8:
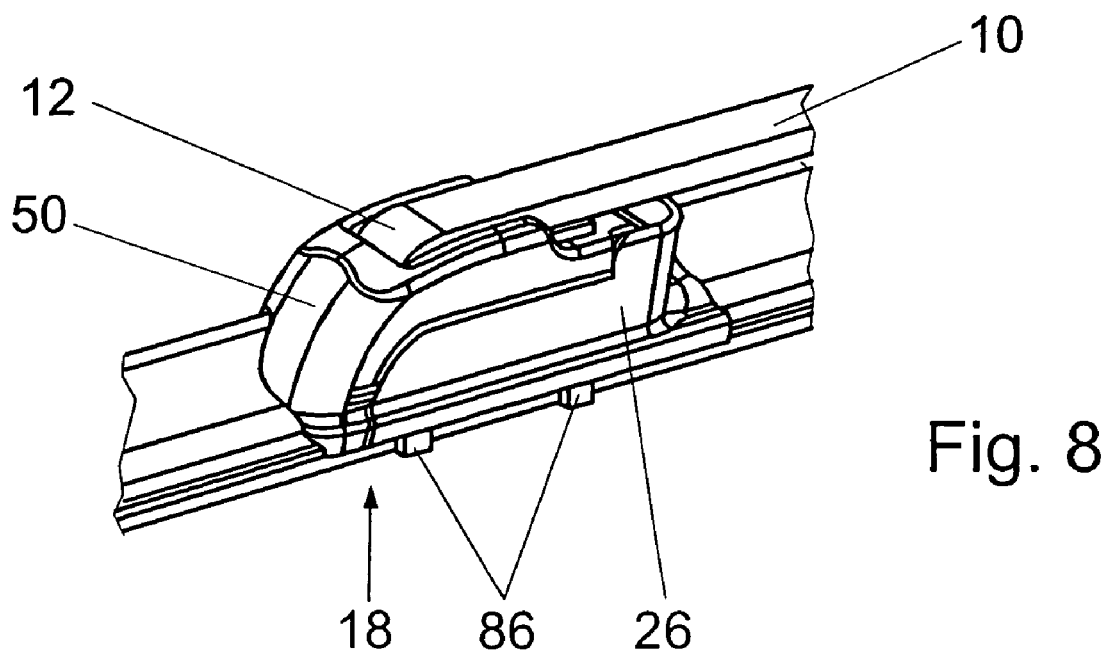
FIG. 8 A perspective view of a wiper blade completely assembled on a wiper rod.

In order to assemble the wiper blade 18 on the wiper rod 10 of the wiper arm, the cover 50 is opened and the hook-shaped end 12 is pushed through the opening 44 of the cover 50 in the longitudinal direction of the wiper blade 18. Once the lower leg 16 of the hook-shaped end 12 passes the bearing surface 72 of the adapter 66, the wiper blade 18 is displaced in the direction of the upper leg 14 until the bearing surface 70 is adjacent to the inner side of the upper leg 14. Then the wiper blade 18 is displaced in the direction of the bent part of the hook-shaped end 12 until the inner surface is adjacent to the bearing surface 72 of the adapter 66. With this movement, the side wings 74 with the locking noses 76 are temporarily pressed elastically towards the outside so that the hook-shaped end 12 can pass. In the final position the locking noses 76 reassume their initial position so that they hold the hook-shaped end 12 on the bearing surface 72 (FIG. 7). When closing the cover 50, a limiting bridge 64 with a limiting surface is positioned on the outer contour of the bent part of the hook-shaped end 12, whereby the hook-shaped end 12 is held on the bearing surface 72 independently of the locking noses 76. The limiting bridge 64 is a part of the cover 50 and projects a distance far into the intermediate space 34 of the protective cap 26 so that it can fulfill the described function. FIG. 8 shows that the closed articulated connection harmonically adjoins the wiper blade 18 and all requirements for a design that is favorable for flow are met.

The invention claimed is:

1. Wiper blade (18) with a connecting device (84) to connect a wiper arm (10), which connecting device features a pivoted adapter (66) equipped with holding surfaces (70, 72) for the wiper arm (10) and an openable and closeable protective cap (26), which in its closed position can fix the wiper arm (10) with limiting surfaces (64) arranged on an inner side by means of the holding surfaces (70, 72), characterized in that the protective cap (26) has an openable and closeable cover (50), and the cover (50) includes a covering wall defining an opening (44) through which the wiper arm (10) can be connected to the adapter (66).

2. Wiper blade (18) according to claim 1, characterized in that the protective cap (26) includes the connecting device (84) and is clipped via this, wherein the cover (50) features the limiting surface (64) on its inner side, through which, in a closed position of the cover (50), a hook-shaped end (12) of the wiper arm (10) is fixed on the adapter (66) in its assembled position.

3. Wiper blade (18) according to claim 1, characterized in that the cover (50) is pivoted on the protective cap (26) in the area of a rear wall (30) of the protective cap (26), which points towards the drive-side end of the wiper blade (18).

4. Wiper blade (18) according to claim 3, characterized in that either the cover (50) or the protective cap (26) features at least one open hub (52) in the area of the rear side (30), which cooperates with a cylindrical bearing element (46) that is flattened on the circumference in such a way that the open hub (52) can be pushed over the flattenings (48) of the bearing element (46) in the completely opened position of the cover (50), while the hub (52) is held on the bearing element (46) in a half-opened or closed position of the cover (50).

5. Wiper blade (18) according to claim 3, characterized in that the cover (50) has at least one locking pin (62) in the area of its front wall (58), which engages in a locking opening (40) on the protective cap (26) in the closed position of the cover (50).

6. Wiper blade (18) according to claim 1, characterized in that a limiting bridge (64) projecting on the inner side of the cover (50) in the area of a front wall (58) forms the limiting surface.

7. Wiper blade (18) according to claim 2, characterized in that the cover (50) is pivoted on the protective cap (26) in the area of a rear wall (30) of the protective cap (26), which points towards the drive-side end of the wiper blade (18).

8. Wiper blade (18) according to claim 4, characterized in that the cover (50) has at least one locking pin (62) in the area of its front wall (58), which engages in a locking opening (40) on the protective cap (26) in the closed position of the cover (50).

9. Wiper blade (18) according to claim 2, characterized in that a limiting bridge (64) projecting on the inner side of the cover (50) in the area of a front wall (58) forms the limiting surface.

10. Wiper blade (18) according to claim 3, characterized in that a limiting bridge (64) projecting on the inner side of the cover (50) in the area of a front wall (58) forms the limiting surface.

11. Wiper blade (18) according to claim 4, characterized in that a limiting bridge (64) projecting on the inner side of the cover (50) in the area of a front wall (58) forms the limiting surface.

12. Wiper blade (18) according to claim 5, characterized in that a limiting bridge (64) projecting on the inner side of the cover (50) in the area of a front wall (58) forms the limiting surface.

13. Wiper blade (18) according to claim 7, characterized in that the cover (50) has at least one locking pin (62) in the area of its front wall (58), which engages in a locking opening (40) on the protective cap (26) in the closed position of the cover (50).

14. Wiper blade (18) according to claim 7, characterized in that either the cover (50) or the protective cap (26) features at least one open hub (52) in the area of the rear side (30), which cooperates with a cylindrical bearing element (46) that is flattened on the circumference in such a way that the open hub (52) can be pushed over the flattenings (48) of the bearing element (46) in the completely opened position of the cover (50), while the hub (52) is held on the bearing element (46) in a half-opened or closed position of the cover (50).

15. Wiper blade (18) according to claim 14, characterized in that the cover (50) has at least one locking pin (62) in the area of its front wall (58), which engages in a locking opening (40) on the protective cap (26) in the closed position of the cover (50).

16. Wiper blade (18) according to claim 15, characterized in that a limiting bridge (64) projecting on the inner side of the cover (50) in the area of a front wall (58) forms the limiting surface.

* * * * *